3,761,454
VULCANIZABLE FLUORINATED POLYMER COMPOSITIONS, PROCESS FOR VULCANIZATION, AND VULCANIZED ELASTOMERS OBTAINED THEREFROM
Sergio Geri, Angelo Miglierina, and Giovanni Ceccato, Milan, Italy, assignors to Montecatini Edison S.p.A., Milan, Italy
No Drawing. Filed July 6, 1971, Ser. No. 162,173
Claims priority, application Italy, July 6, 1970, 27,046/70
Int. Cl. C08f *15/06, 15/32, 15/40*
U.S. Cl. 260—80.77                                   9 Claims

ABSTRACT OF THE DISCLOSURE

Vulcanizable composition comprising (A) a fluorinated interpolymer and (B) a vulcanizing system which comprises (1) a carbamate, oxalate, formate or acetate of either piperazine or of an alkylenedipiperidine of the formula

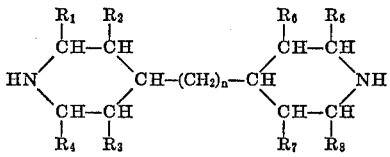

wherein each of $R_1$, $R_2$, $R_3$, $R_4$, $R_5$, $R_6$, $R_7$ and $R_8$ independently is hydrogen, halogen, or an alkyl containing from 1 to 3 carbon atoms; $n$ is a whole number from 1 to 12; and (2) a bivalent metal oxide, i.e., magnesium oxide, calcium oxide, or lead monoxide.

BACKGROUND OF THE INVENTION

(1) Field of the invention

The present invention relates to novel vulcanizable compositions of fluorinated interpolymers, particularly to fluorinated copolymers or terpolymers, and to vulcanized elastomers obtained therefrom. The invention further comprises a process for vulcanizing such flourinated interpolymers.

(2) Description of the prior art

Vulcanized elastomers of fluorinated polymers are known. Such polymers are widely used for dynamic and static sealing gaskets for motors, as well as for cables and conveyor belts that come in contact with chemical agents.

It is necessary that vulcanized elastomers obtained from the uncured polymers exhibit those properties that are necessary for the particular end uses for which they are intended.

The requirements of the end users of elastomers, and particularly of end users of fluorinated elastomers, are varied. The end user is concerned not only with the properties of the end products but also with the processing cycle employed in preparing such products, inasmuch as process variables will affect the end properties.

It is, of course, necessary that the vulcanized products have good mechanical properties, including resistance to buckling over a wide range of temepratures. On the other hand, it is equally important that the vulcanized product has adequate thermal and chemical resistance, particularly when such products are fluorinated elastomers as there are ordinarily employed under severe conditions as regards heat and/or chemical attack.

Moreover, the vulcanizing system or "recipe" for flourinated polymers must enable one to obtain mixes having good storage stabiilty. Further, the vulcanizable mix must be easy to work with, give reliable results, and permit sufficient vulcanization at the processing temperature without the occurrence of scorching during the preliminary steps of procesing which precede the actual vulcanizing operation.

In additon, the vulcanizing system must be such as to permit easy withdrawal of the molded article from the mold. Further, the product should be free of any appreciable spoiling or stickiness that might arise as a result of vulcanization in the mold.

The vulcanizing systems presently used for vulcanizing saturated fluorinated polymers comprise linear diamino compounds (which may or may not contain cyclic radicals), wherein the amino atoms are outside of rather than within the cyclic ring. The diamino compounds most generally used are: di-cinnamlidene-hexamethylenediamine, carbamate, and methane(bis-cyclohexyl)-diamine carbamate.

Not all the amino-containing compounds result in a very satisfactory vulcanizing activity, nor do they all yield vulcanized products contemporaneously endowed with excellent resistance to permanent buckling and low tendency to scorching in relation to storage time and temprature or to temperatures used in special processing such as, for instance, extrusion.

SUMMARY OF THE INVENTION

We have now found that we can obtain vulcaized products made up of fluorinated polymers, which products have good elasticity, excellent resistance to compression, and at the same time, a low degree of scorching. This results from using in the vulcanization a vulcanizing system comprising (1) one or more carbamates, oxalates, formates or acetates of piperazine or of an alkylenedipiperidine of the general formula

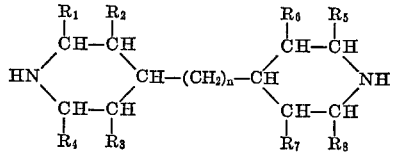

wherein $R_1$, $R_2$, $R_3$, $R_4$, $R_5$, $R_6$, $R_7$ and $R_8$ may be the same or different from one another and independently are hydrogen, halogen, or an alkyl group containing from 1 to 3 carbon atoms; and $n$ is a whole number between 1 and 12, preferably between 1 and 4; and (2) one or more bivalent metal oxides selected from the group consisting of magnesium oxide, calcium oxide and lead monoxide (PbO).

DESCRIPTION OF THE PREFERRED EMBODIMENTS

The foregoing vulcanizing system may be used for the vulcanizable composition either alone or in combination with additives, namely, nucleophilic polyfunctional aromatic compounds, such as, for instance, p-phenylenediamine and hydroquinone.

The resultant vulcanized products show, in addition to surprisingly low compression set values, a good vulcanization rate. Moreover, one enjoys excellent processing safety during the preparation of the mixes. The vulcanizing mix shows good stability over extended periods, as do molded products, e.g., as obtained by extrusion, compression molding, or the like.

The vulcanizable compositions of this invention thus comprise (A) a fluorinaed interpolymer, preferably a fluorinated copolymer or terpolymer, and
(B) a vulcanizing system comprising
    (1) piperazine or a salt of an alkylendipiperidine as defined above, in an amount of from 0.5 to 10 parts by weight and preferably from 0.8 to 2 parts by weight per 100 parts of fluorinated interpolymer (copolymer or terpolymer), and (2) one or more oxides of bivalent metal as above defined, in an amount of from about 5 to 40 parts by weight, and preferably from 10 to 25 parts by weight, per 100 parts of fluorinated interpolymer.

Of course, the foregoing composition may also contain other conventional additives that are well known to those skilled in the art.

Vulcanized products having excellent physical-mechanical properties are also obtained when using reinforcing or non-reinforcing fillers. In addition to fillers, e.g., the carbon blacks, ceruses, etc., there may be added plasticizing oils and lubricants, according to techniques well known and widely adopted by users of fluorinated elastomeric products.

Considering the fluorinated interpolymer, virtually all saturated elastomeric polymers and copolymers are suitable. Copolymers and terpolymers that are preferred include:

vinylidene fluoride/1-hydropentafluoropropene copolymer,
vinylidene fluoride/2-hydropentafluoropropene copolymer,
vinylidene fluoride/1,1-dihydrotetrafluoropropene copolymer,
1-hydropentafluoropropene/tetrafluoroethylene copolymer,
vinylidene fluoride/hexafluoropropene copolymer,
vinylidene fluoride/trichloroethylene copolymer,
vinylidene fluoride/tetrafluoroethyl/1-hydropentafluoropropene terpolymer,
vinylidene fluoride/hexafluoropropene/tetrafluoroethylene terpolymer,
vinylidene fluoride/tetrafluoroethylene/1,1-dihydrotetrafluoropropene terpolymer, etc.

The best results are obtained when the copolymer contains 30%–70% by weight of vinylidene fluoride and from 70%–30% by weight of 1-hydropentafluoropropene or 2-hydropentafluoropropene; or when the terpolymer is vinylidene fluoride/tetrafluoroethylene/1-hydropentafluoropropene terpolymer or vinylidene fluoride/tetrafluoroethylene/hexafluoropropylene terpolymer, with the molar percentage of the three co-monomers being, respectively, from 40 to 80, from 30 to 10, and from 30 to 10.

The vulacinzing system of the invention exerts a much more controlled vulcanizing action on vulcanizable fluoroelastomeric compositions when used in combination with polynucleophilic agents in a basic medium.

The use of the above cited diamino compounds in the form of their salts enables one to eliminate the unwanted phenomenon of scorching, thus completely eliminating the tendency to volatilize, which tendency is particularly exacerbated during the mixing stage and the preserving stage of the elastomeric formulations containing the amino compounds in an non-salt form.

It has also been found that the elastomeric compositions containing the vulcanizing systems of this invention do not cause any stickiness or soilig of the molds. This gives rise to a higher productivity and to more regular processing cycles.

The diamino compounds in their salt form are easily obtained in the pure state, may be readily incorporated into the vulcanizable compositions without any difficulty, and do not cause any secondary unwanted phenomena.

Vulcanization of the elastomeric compositions of this invention is carried out under pressure and at a temperature of from about 140° to 200° C., and preferably from 150° C. to 180° C., with a curing time of from about 5 to 60 minutes, and preferably not in excess of 30 minutes. Subsequently, the articles thus obtained are post-vulcanized in an oven at a temperature of from about 150° C. to 300° C., and preferably from 200° C. to 265° C., for a time of from about 5 to 48 hours, and preferably from 15 to 24 hours.

The vulcanized elastomers obtained from the compositions of the invention are particularly suitable for the manufacture of high temperature-resistant materials, e.g., sealing gaskets, transmission belts, conveyors belts, cable-sheathings, etc.

The following examples will further illustrate this invention. All parts are by weight unless otherwise stated.

EXAMPLE 1

The fluoroelastomer used was a vinylidene fluoride/tetrafluoroethylene/1 - hydropentafluoropropene (3:1:1 molar ratio) terpolymer having a Mooney viscosity ML(1+4) at 100° C.=90 and a specific weight at 25° C. of 1.816 g./cc. (a commercial product known by the trademark "Tecnoflon T" of Montecatini Edison S.p.A.).

100 parts by weight of this fluoroelastomer were admixed in a water-cooled roller mill with 15 parts by weight of magnesium oxide and with 25 parts by weight of MT carbon black. After homogeneous mixing for 20 minutes, the mix was subdivided into 7 batches, to each of which a different diamino vulcanizing agent was added, as set out in Table 1 hereinafter. (Table 1 reports the by-weight and molar quantities of each vulcanizing agent per 100 parts by weight of fluorinated elastomer.)

The following measurements were carried out on these 7 batches:

(1) resistance to permanent set under compression, on test pieces vulcanized in a press for 20 minutes at 165° C. and post-vulcanized in an air circulating oven at 250° C. for 16 hours, after a gradual rise of the temperature from 160° C. to 250° C. over a period of 8 hours;

(2) scorchability in relation to temperature and to storing time.

For the scorching evaluation (stability of the mixes), a molding method was adopted which enabled one to detect the starting point of vulcanization that occurred duirng storage. The mixes prepared with the different vulcanizing systems under examination were stored at two different temperatures and for different times. At the end of the time period, established procedures were followed for the molding tests.

A mold was used with an Archimede spiral shaped impression, 83 cm. long with a cross-section area of 40 sq. mm., of triangular cross-section, but with a very blunt vertical angle.

The feeding of the impression was carried out at the inside end of the spiral, through 4 circular holes 30 mm. long and with a diameter of 2.2 mm. These holes departed from a cylindrical cavity which acted as feeding chamber wherein a suitable quantity of mix was placed. This mix was then pushed through the circular holes by means of a piston having a diameter of 69.80 mm.

The mold was then heated and maintained at the desired temperature (160° C.) both by the circulation of hot oil through a series of small ducts pierced into the body of the mold itself as well as by means of the heated platens of the press.

The procedure was as follows. The established quantity of mix was placed into the feeding chamber. The piston was then placed over the mix and the whole then placed between the platens of the press.

After 2 minutes, during which the mix was heated, a pressure was applied which, in 15 seconds, was gradually brought up to a total load of 30 tons/sq. cm. This pressure and temperature were maintained for 30 minutes in order to obtain a sufficient degree of vulcanization. Thereupon the mold was opened, the spiral extracted, and the attained length measured. This length was expressed as a percentage of the total length of the mold impression.

The percentage length of the spiral and the absence of perceivable faults thereon were considered as an index of the behavior of the mix under storage. In the case of stable mixes a full spiral was obtained, that is a 100% length. In the case of mixes that were partially pre-vulcanized, these latter did not have a sufficient fluidity and, therefore, did not completely fill up the mold impressions, so that an incomplete spiral with a length below 100% was obtained.

The compression set tests and the scorching tests carried out on the elastomeric compositions containing vulcanizing diamino agents of various types are set out in Table 1.

EXAMPLE 2

Example 1 was repeated, except that a vinylidene fluoride/1-hydropentafluoropropene copolymer (molar ratio 80:20) was used as the fluorinated polymer.

The compression set and scorching values are set out in Table 2.

Referring to the compression set and scorching data reported in Table 2, it will be seen that in Tests 1 and 2, carried out on compositions according to the invention,

TABLE 1

| Test No. | Diamino vulcanizing agent | Compression set percent B (ASTM D 395) conditioning temperature and time | | Scorching (percent) with respect to storage time and temperature of— | | | | | |
|---|---|---|---|---|---|---|---|---|---|
| | | | | 25° C. | | | 40° C. | | |
| | | 200° C. x 24 hrs. | 200° C. x 72 hrs. | 1 day | 15 days | 45 days | 1 day | 15 days | 45 days |
| 1 | Piperazine carbamate, 1.3 p.b.w. (11.6 millimoles) | 10 | 18 | 100 | 100 | 100 | 100 | 100 | 100 |
| 2 | 4,4'-trimethylenedipiperidine carbamate, 1.2 p.b.w. (4.8 millimoles). | 13 | 23 | 100 | 95 | 70 | 100 | 55 | 25 |
| 3 | Piperazine, 1 p.b.w. (11.6 millimoles) | 12 | 21 | 80 | 50 | 25 | 30 | (¹) | (¹) |
| 4 | 4,4'-trimethylenedipiperidine, 1 p.b.w. (4.8 millimoles) | 15 | 24 | (¹) | | | | | |
| 5 | Hexamethylenediamine carbamate, 1.85 p.b.w. (11.6 millimoles). | 20 | 36 | 55 | (¹) | | | | |
| 6 | Dicinnam lidenehexamethylenediamine, 3.5 p.b.w. (10 millimoles). | 22 | 38 | 100 | 100 | 86 | 100 | 85 | 70 |
| 7 | Methane(bis-cyclohexyl)diamine, 2.4 p.b.w. (10 millimoles) | 27 | 45 | 75 | 35 | (¹) | 40 | (¹) | (¹) |

¹ Does not flow.

NOTE.—p.b.w.=Percent by weight.

Referring to the compression set data and the scorching data of Table 1, it will be seen that Tests 1 and 2, the results, on the whole, were very good for both of the examined parameters.

TABLE 2

| Test No. | Diamino vulcanizing agent | Compression set percent B (ASTM D 395) conditioning temperature and time | | Scorching (percent) with respect to storage time and temperature of— | | | | | |
|---|---|---|---|---|---|---|---|---|---|
| | | | | 25° C. | | | 40° C. | | |
| | | 200° C. x 24 hrs. | 200° C. x 72 hrs. | 1 day | 15 days | 45 days | 1 day | 15 days | 45 days |
| 1 | Piperazine carbamate, 1.3 p.b.w. (11.6 millimoles) | 11 | 20 | 100 | 100 | 100 | 100 | 100 | 100 |
| 2 | 4,4'-trimethylenedipiperidine carbamate, 1.2 p.b.w. (4.8 millimoles. | 15 | 25 | 100 | 97 | 74 | 100 | 67 | 31 |
| 3 | Piperazine, 1 p.b.w. (11.6 millimoles) | 13 | 24 | 86 | 58 | 29 | 38 | (¹) | |
| 4 | 4,4'-trimethylenedipiperidine, 1 p.b.w. (4.8 millimoles) | 16 | 25 | 11 | (¹) | | | | |
| 5 | Hexamethylenediamine carbamate, 1.85 p.b.w. (11.6 millimoles). | 23 | 41 | 63 | (¹) | | | | |
| 6 | Dicinnamylidenehexamethylenediamine, 3.5 p.b.w. (10 millimoles). | 28 | 45 | 100 | 100 | 96 | 100 | 92 | 79 |
| 7 | Methane(bis-cyclohexyl)diamine carbamate, 2.4 p.b.w. (10 millimoles). | 32 | 47 | 91 | 48 | (¹) | 61 | (¹) | |

¹ Does not flow.

NOTE.—p.b.w.=Percent by weight.

carried out with mixes containing piperazine and 4,4'-trimethylenedipiperidine carbamate, respectively, yield results that, on the whole, are better than those attained with the mixes of Tests 3–7. More particularly, in Tests 3 and 4, wherein the free amines were used rather than their salts, even where good compression set values were attained, there was a considerable tendency of the mixes to scorch. On the other hand, Test 6, which yielded good values of scorching, showed compression set values definitely inferior to those of Tests 1 and 2. Tests 5 and 7 were substantially negative for both of the examined parameters.

EXAMPLE 3

Several different recipes were used, each based on vinylidene fluoride/1 - hydropentafluoropropene/tetrafluoroethylene terpolymer in molar ratios of 60–20–20, having a Mooney ML(1+4) viscosity at 100° C.=90.

The recipes (in parts by weight), the vulcanizing conditions, the mechanical properties, and the compression set of the culcanized elastomers are set out in Table 3.

TABLE 3

| | | | | | | | | | |
|---|---|---|---|---|---|---|---|---|---|
| Terpolymer, amount | 100 | 100 | 100 | 100 | 100 | 100 | 100 | 100 | 105 |
| MgO | 15 | | | 15 | 15 | 5 | 10 | 15 | 10 |
| CaO | | 15 | | | | | | | |
| PbO | | | 15 | | | | | | |
| Carbon black MT | 20 | 20 | 20 | 20 | 20 | 20 | 20 | 20 | 60 |
| Piperazine carbamate | 1.3 | 1.3 | 1.3 | 1.0 | 1.5 | 1.3 | 1.3 | | 1.3 |
| Piperazine acetate | | | | | | | | 1.7 | |

| Vulcanization conditions | Vulcanization in a press at 170° C. for 13 minutes. Post-vulcanization in an oven for 8 hrs. at a temperature gradually rising from 25° C. to 250° C., then for 16 hrs. at 250° C. |
|---|---|

| Mechanical properties: | | | | | | | | | |
|---|---|---|---|---|---|---|---|---|---|
| Modulus at 100%, kg./cm.² | 42 | 50 | 46 | 28 | 62 | 23 | 28 | 44 | 100 |
| Tensile strength, kg./cm.² | 200 | 130 | 160 | 230 | 195 | 245 | 235 | 195 | 170 |
| Elongation at break, percent | 230 | 200 | 210 | 335 | 190 | 360 | 350 | 240 | 155 |
| Hardness (Shore A) IRHD | 69 | 75 | 68 | 64.5 | 72 | 65 | 66 | 68.5 | 89 |
| Compression-set percent B (ASTM D 395): | | | | | | | | | |
| 200° C. x 24 hours | 10 | 12 | 15 | 13 | 11 | 14 | 12 | 10 | 11 |
| 200° C. x 72 hours | 18 | 19 | 21 | 23 | 20 | 23 | 22 | 18 | 24 |

EXAMPLE 4

For the preparation of the mixes of this example there were respectively used Polymer A, a vinylidene fluoride/ hexafluoropropene copolymer (in a 75:25 molar ratio), and Polymer B, a vinylidene fluoride/hexafluoropropene/tetrafluoroethylene terpolymer (in a molar ratio of 60:20:20).

100 parts by weight of each of Polymers A and B were admixed respectively 15 parts of magnesium oxide, 20 parts of carbon black MT, and various types of diamino vulcanizing agents. Test pieces were then obtained from these mixes which, after vulcanization in a press for 30 minutes at 160° C. and post-vulcanized in an oven at 260° C. for 16 hours (these pieces previously having been heated with a gradual rise of temperature from 25° C. to 260° C.), were subjected to compression-set.

The compression-set values are set out in Table 4. Referring to the data, it will be seen that the values for recipes 1 and 2, containing a vulcanizing system according to this invention, were definitely superior to those for recipes 3, 4 and 5, containing vulcanizing systems of the prior art.

TABLE 4

| Test No. | Type of diamino volcanizing agent | Compression-set percent B (ASTM D 395); conditioning temperature and time (polymer)— | | | |
|---|---|---|---|---|---|
| | | 200° C. x 24 hours | | 200° C. x 72 hours | |
| | | A | B | A | B |
| 1 | Piperazine formate, 1.3 p.b.w. (11.6 millimoles) | 12 | 12 | 20 | 19 |
| 2 | 4,4'-trimethylidenedipiperidine carbamate, 1.2 p.b.w. (4.8 millimoles). | 15 | 14 | 28 | 26 |
| 3 | Hexamethylenediamine carbamate, 1.85 p.b.w. (11.6 millimoles). | 28 | 24 | 45 | 38 |
| 4 | Dicinnamylidenehexamethylidenediamine, 3.5 p.n.w. millimoles). | 30 | 25 | 50 | 41 |
| 5 | Methane(bis-cyclohexyl)diamine, 2.4 p.b.w. (10 millimoles). | 21 | 28 | 48 | 46 |

NOTE.—p.b.w.=Percent by weight.

EXAMPLE 5

In order to evaluate the scorching index of elastomeric compositions containing the vulcanizing systems of Example 1, extrusion and molding tests were carried out on three mixes made up of 100 parts by weight of vinylidene fluoride/hexafluoropropene/tetrafluoroethylene terpolymer admixed with 15 parts by weight of MgO, and 25 parts by weight of carbon black MT. In one mix there was admixed 1 part by weight of piperazine; in another mix there was admixed 1.3 parts by weight of piperazine carbamate; in the third mix there was admixed 1.3 parts by weight of piperazine oxalate.

The extrusion was carried out in a Bandera Model 30 extruder. The temperature conditions were as follows:

Temperature of head:
 $T_1$ _____° C__ 40

Temperature of chamber:
 $T_2$ _____° C__ 50
 $T_3$ _____° C__ 70
 Speed of extruding worm screw ____rev./min__ 60

The extrudate prepared from vulcanizable elastomeric compositions contining piperazine (not the piperazine salt) exhibited a non-smooth, uneven surface, which is a sign of a partial scorching. By contrast, the extrudents containing the piperazine salts (carbamate and oxalate) exhibited a smooth, even surface, indicating virtually no scorching.

The extrudates, in the form of rods, were used as premoldings for O-ring molds and then subjected to vulcanization in a press in order to evaluate the flowability of the elastomeric composition and the "weldability" of the two ends of the extruded body, which weldability, as is well known, may be seriously impaired if prevulcanization or scorching has occurred during extrusion.

The vulcanizing conditions in the press were 170° C. for 12 minutes.

Excellent results as regards weldability and quality of the O-ring were obtained when vulcanizable compositions contained the diamino product in the form of carbamate or oxalate. By contrast, when the diamino compound was used in the free form, poor results were obtained due to the tendency of the mix to prevulcanize.

EXAMPLE 6

Using the elastomeric mixes described in Example 1, tests for prolonged molding were carried out in order to ascertain the extent of mold soilability wtih reference to the type of vulcanizing system used.

The composition of the mix was as follows:

| | Parts by weight |
|---|---|
| Terpolymer | 100 |
| Magnesium oxide | 15 |
| Carbon black MT | 20 |

The elastomeric mix was then subdivided into two parts, to one of which 1.5 parts by weight of piperazine carbamate were added, and to the other of which 3.5 parts by weight of dicinnamylidenehexamethylenediamine were added. The soilability index of these two formulations was estimated using a mold with four circular impressions unconnected with one another from which there were obtained discs having a diameter of 4 cm. and a thickness of 3 mm.

The mold was made of steel and the inside surfaces of the cavity of the impressions were lapped. In order to better evaluate the formation of dirt, particular care was devoted to the mechanical finish of the mold, especially with regard to obtaining a sharp corner at the base of the impression.

The vulcanizing conditions were as follows:

Temperature in the press _____° C__ 170
Vulcanizing time _____minutes__ 12

Reserving two circular impressions respectively for each mix, 150 vulcanizations were carried out consecutively in the same mold at the above indicated conditions, using as the mold release agent a 12% aqueous emulsion of very low molecular weight polyethylene.

At the end of the test, the circular impressions used for the elastomeric formulation containing dicinnamylidenehexamethylenediamine were distinctly soiled, thereby impairing easy removal of the molded article as well as its quality. The other two circular impressions used for the formulations containing piperazine carbamate were unaltered, remaining in the same condition as at the start of the testing.

Variations can, of course, be made without departing from the spirit and scope of the invention.

Having thus described the invention, what is desired to be secured by Letters Patent and hereby claimed is:

1. A vulcanizable composition comprising (A) a fluorinated interpolymer and (B) a vulcanizing system which comprises (1) a salt selected from the group consisting of the carbamates, oxalates, formates and acetates of piperazine or of an alkylenedipiperidine of the formula

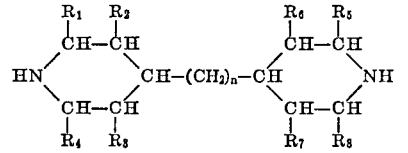

wherein each of $R_1$, $R_2$, $R_3$, $R_4$, $R_5$, $R_6$, $R_7$ and $R_8$ is hydrogen, halogen, or an alkyl containing from 1 to 3 carbon atoms; $n$ is a whole number from 1 to 12; said salt being present in an amount of from 0.5 to 10 parts by weight per 100 parts of interpolymer and (2) a bivalent metal oxide selected from the group consisting of magnesium oxide, calcium oxide and lead monoxide, said oxide being present in an amount of from about 5 to 40 parts by weight per 100 parts of interpolymer.

2. The composition of claim 1 wherein said interpolymer is a copolymer or terpolymer.

3. The composition of claim 2 wherein $n$ is from 1 to 4, the amount of said salt is from 0.8 to 2 parts per 100 parts of interpolymer, and the amount of said oxide is from 10 to 25 parts per 100 parts of interpolymer.

4. The composition of claim 1, additionally comprising a reinforcing or non-reinforcing filler.

5. The composition of claim 1, additionally comprising a plasticizer or lubricant.

6. The composition of claim 1 wherein the oxide is magnesium oxide.

7. The composition of claim 3 wherein said fluorinated copolymer or terpolymer is selected from the group consisting of vinylidene fluoride/1-hydropentafluoropropene copolymer,
vinylidene fluoride/2-hydropentafluoropropene copolymer,
1-hydropentafluoropropene/tetrafluoroethylene copolymer,
vinylidene fluoride/1,1-dihydrotetrafluoropropene copolymer,
vinylidene fluoride/hexafluoropropene copolymer,
vinylidene fluoride/trichlorofluoroethylene copolymer,
vinylidene fluoride/tetrafluoroethylene/1-hydrofluoropropene terpolymer,
vinylidene fluorine/hexafluoropropene/tetrafluoroethylene terpolymer, and
vinylidene fluoride/tetrafluoroethylene/1,1-dihydrotetrafluoropropene terpolymer.

8. A method of vulcanizing the composition of claim 1 comprising heating said composition under pressure at a temperature of from about 140° C. to 200° C. for a time of from about 5 to 60 minutes, and thereafter postvulcanizing by heating at a temperature of from about 150° C. to 300° C. for a time of from about 5 to 48 hours.

9. The method of claim 8 wherein the first heating step is carried out at a temperature of from about 150° C. to 180° C. and wherein said post-vulcanizing step is carried out at a temperature of from about 200° C. to 265° C. for from 15 to 24 hours.

References Cited
UNITED STATES PATENTS

| | | | |
|---|---|---|---|
| 2,979,490 | 4/1961 | West | 260—87.7 |
| 3,090,775 | 5/1963 | Smith | 260—87.7 |

MORRIS LIEBMAN, Primary Examiner

P. R. MICHL, Assistant Examiner

U.S. Cl. X.R.
260—97.5 A, 87.7

PO-1050
(5/69)

UNITED STATES PATENT OFFICE
CERTIFICATE OF CORRECTION

Patent No. 3,761,454          Dated September 25, 1973

Inventor(s) Sergio Geri, Angelo Miglierina and Giovanni Ceccato.

It is certified that error appears in the above-identified patent and that said Letters Patent are hereby corrected as shown below:

Column 1, line 10: "27,046/70" should read -- 27,046 A/70 --.
Column 2, line 12: "amino atoms" should read -- amino nitrogen atoms --. Column 2, lines 14-15: "di-cinnamlidene-hexamethylenediamine, carbamate" should read -- di-cinnamylidene-hexamethylendiamine, hexamethylendiamine carbamate --. Column 3, line 60: "soilig" should read -- soiling --. Column 4, line 34: "160°C" should read -- 165°C --. Column 4, lines 53-54: "chamber wherein" should read -- chamber with a diameter of 70 mm and a height of 50 mm, wherein --. Columns 5-6, Table 1, Test No. 6: "Dicinnam lidenehyxamethylidenediamine" should read -- Dicinnamylidenehexamethylidenediamine --. Columns 5-6, Table 3, line 1, last column: "105" should read -- 100 --. Columns 5-6, Table 3, line 2, last column: "10" should read -- 15 --. Columns 7-8, Table 4, Test No. 4: "3.5 p.n.w. millimoles)." should read -- 3.5 p.b.w. (10 millimoles). --. Columns 7-8, Table 4, Test No. 5, under column "A": "2i" should read -- 28 --.

Signed and sealed this 19th day of February 1974.

(SEAL)
Attest:

EDWARD M. FLETCHER, JR.        C. MARSHALL DANN
Attesting Officer               Commissioner of Patents